United States Patent
Ivanov et al.

(10) Patent No.: US 7,343,355 B2
(45) Date of Patent: Mar. 11, 2008

(54) CALCULATING PRICE ELASTICITY

(75) Inventors: Boyko Ivanov, Morgan Hill, CA (US); Vibhu Kalyan, Plano, TX (US); Sushil Ranjan, Irving, TX (US)

(73) Assignee: i2 Technologies US, Inc., Dallas, TX (US)

( * ) Notice: Subject to any disclaimer, the term of this patent is extended or adjusted under 35 U.S.C. 154(b) by 1060 days.

(21) Appl. No.: 10/279,182

(22) Filed: Oct. 23, 2002

(65) Prior Publication Data
US 2003/0177103 A1    Sep. 18, 2003

Related U.S. Application Data

(60) Provisional application No. 60/365,067, filed on Mar. 14, 2002.

(51) Int. Cl.
*G06Q 99/00*    (2006.01)

(52) U.S. Cl. .............................. 705/400; 705/1; 705/7; 705/10

(58) Field of Classification Search .................... 705/1, 705/7, 10, 14, 400, 35, 37
See application file for complete search history.

(56) References Cited

U.S. PATENT DOCUMENTS 6,473,084 B1 * 10/2002 Phillips et al. .............. 345/440

| | | | |
|---|---|---|---|
| 6,553,352 B2 * | 4/2003 | Delurgio et al. ............ | 705/400 |
| 7,072,848 B2 * | 7/2006 | Boyd et al. .................... | 705/10 |
| 2002/0095327 A1 * | 7/2002 | Zumel et al. ................. | 705/10 |
| 2003/0110066 A1 * | 6/2003 | Walser et al. .................. | 705/7 |

FOREIGN PATENT DOCUMENTS

WO    WO 02/29696 A1 * 11/2002

OTHER PUBLICATIONS

Elliot et al., "Price and Consumption-How They Are Related", Summer 1992, Management Quarterly, v33n2 pp. 20-29, 5 pgs.*
Freeman et al., "Modeling methodology. Basics to neural nets-a return to ignorance?", Jan. 1994, Journal of the Market research Society, v36, n1, p. 69 (7 pgs).*
Minga et al., "Dynamic Pricing: Ecommerce-Oriented Price Setting Algorithm", Nov. 2003, IEEE, Proceedings of the Second International Conference on Machine Learning and Cybernetics, pp. 893-898.*

* cited by examiner

*Primary Examiner*—John W. Hayes
*Assistant Examiner*—Freda A. Nelson
(74) *Attorney, Agent, or Firm*—Booth Udall, PLC

(57) ABSTRACT

Calculating price elasticity includes accessing a number of demand models and demand data describing a number of items. The demand models are evaluated in accordance with the demand data. A demand model of the evaluated demand models is selected in response to the evaluation. A price elasticity is calculated according to the selected demand model.

13 Claims, 5 Drawing Sheets

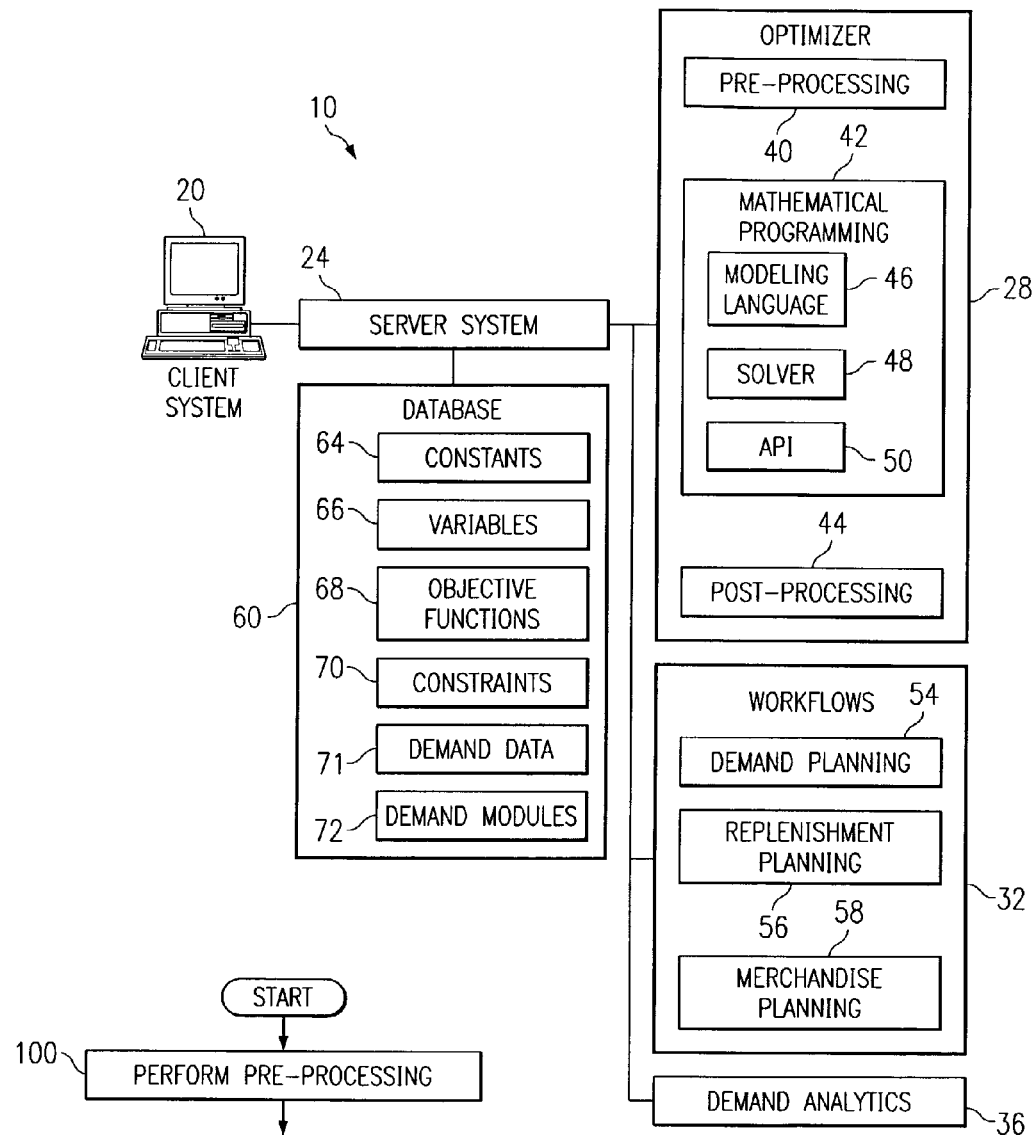

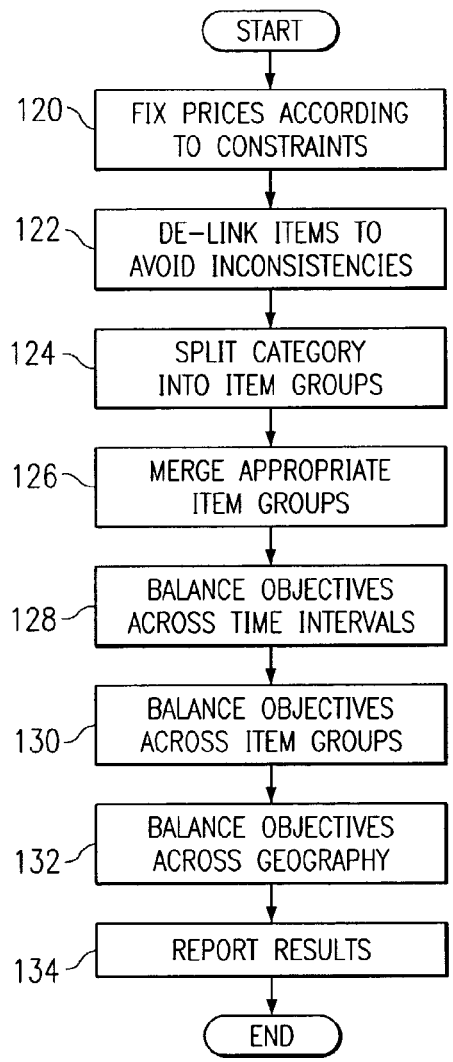
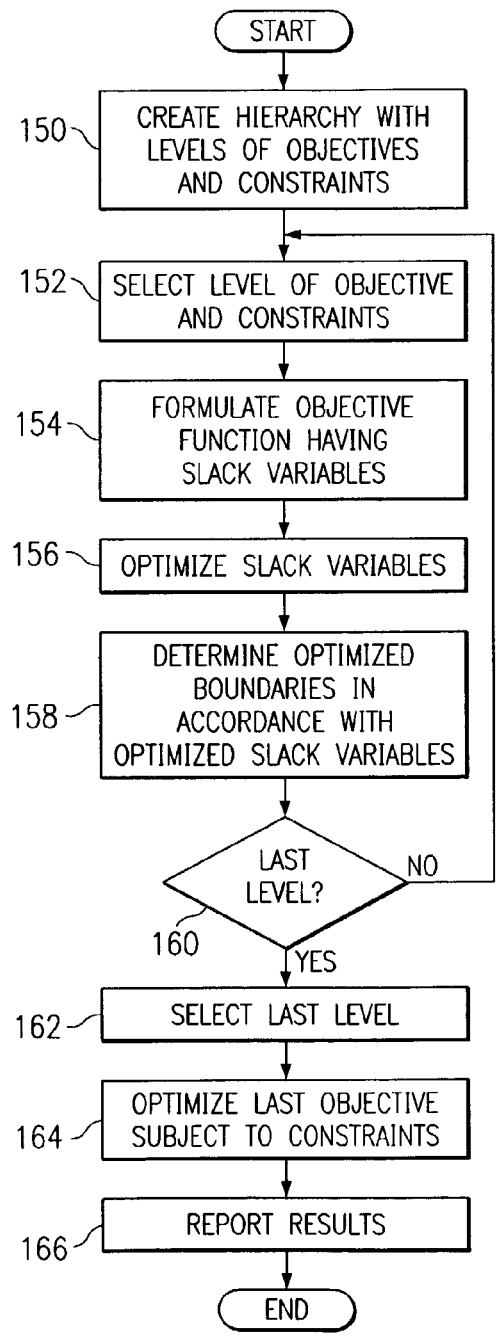

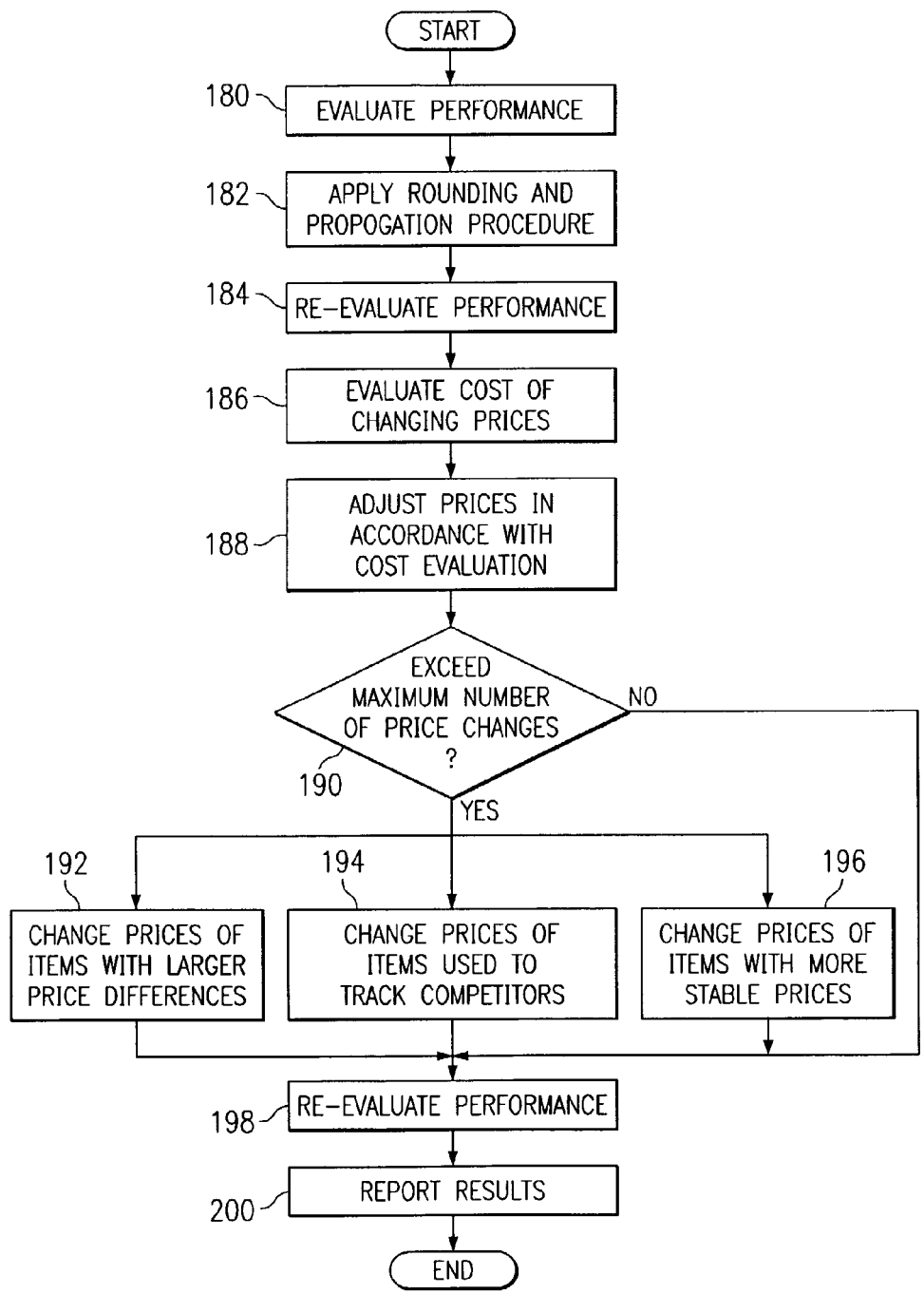

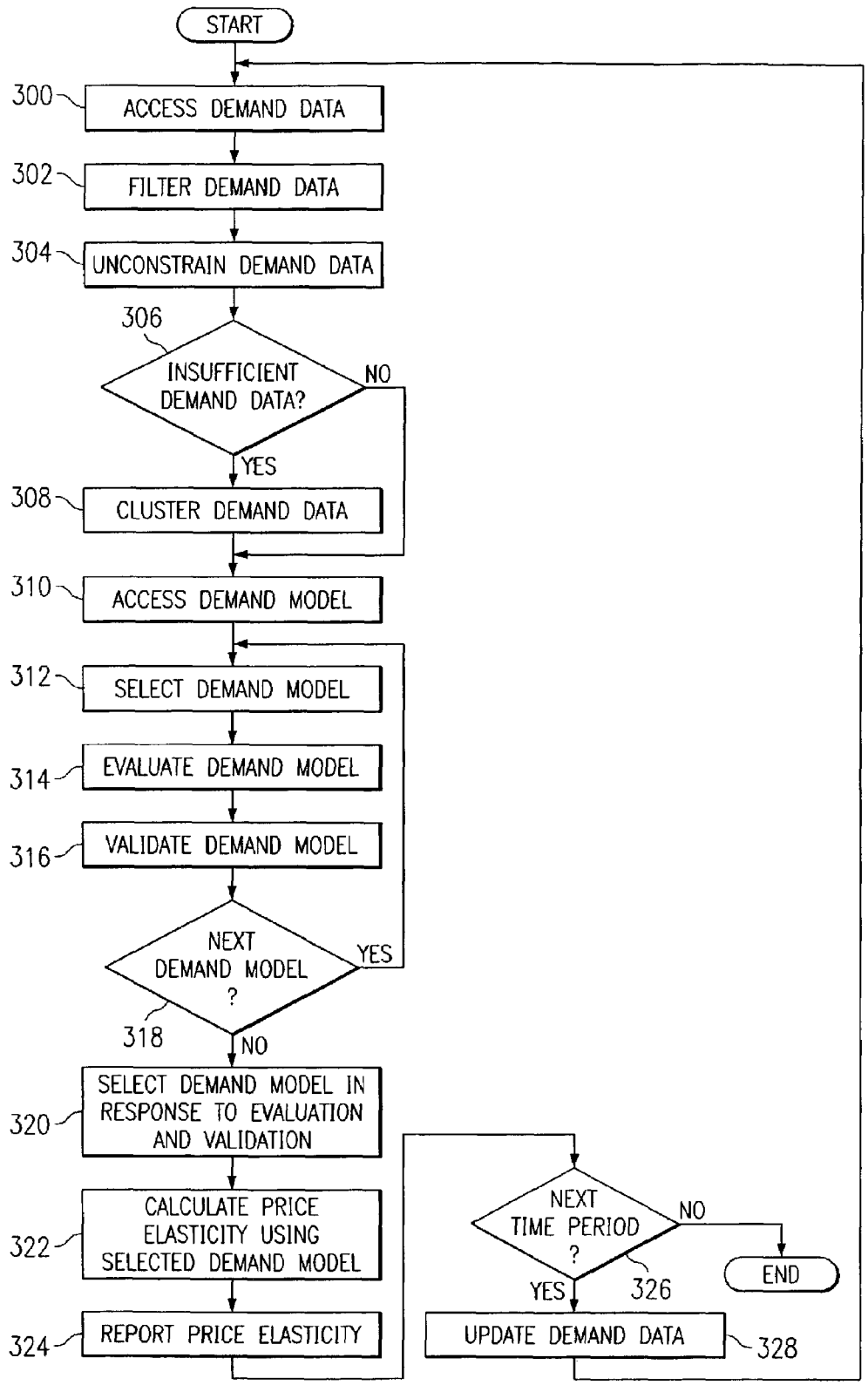

CALCULATING PRICE ELASTICITY

RELATED APPLICATIONS

This application claims benefit under 35 U.S.C. § 119(e) of U.S. Provisional Application Ser. No. 60/365,067, filed Mar. 14, 2002, entitled "PRICE ELASTICITY ESTIMATION FOR PRICING AND PROFIT OPTIMIZATION."

TECHNICAL FIELD OF THE INVENTION

This invention relates generally to the field of supply chain planning and more specifically to calculating price elasticity.

BACKGROUND OF THE INVENTION

A business generates a pricing plan to determine the prices of items offered by the business such as products, goods, or services. An effective pricing plan depends on an accurate measurement of price elasticity, which gauges the impact of price on demand. Many demand models for determining price elasticity, however, do not provide accurate estimates of price elasticity, particularly when applied to certain types of demand data. Consequently, determining price elasticity has posed challenges for businesses.

SUMMARY OF THE INVENTION

In accordance with the present invention, disadvantages and problems associated with previous techniques for determining price elasticity may be reduced or eliminated.

According to one embodiment of the present invention, calculating price elasticity includes accessing a number of demand models and demand data describing a number of items. The demand models are evaluated in accordance with the demand data. A demand model of the evaluated demand models is selected in response to the evaluation. A price elasticity is calculated according to the selected demand model.

Certain embodiments of the invention may provide one or more technical advantages. A technical advantage of one embodiment may be that different demand models are assessed to determine a demand model., By using different demand models instead of a single demand model, a more accurate price elasticity may be determined. Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 1 illustrates an example system that generates an optimized pricing plan for a category of items;

FIG. 2 is a flowchart illustrating an example method for generating an optimized pricing plan;

FIG. 3 is a flowchart illustrating an example method for performing pre-processing to set up a pricing plan problem for a mathematical programming model;

FIG. 4 is a flowchart illustrating an example method for optimizing a mathematical programming model subject to a hierarchy of objectives and constraints;

FIG. 5 is a flowchart illustrating an example method for performing post-processing of the results from optimizing a mathematical programming model;

FIG. 7 is a flowchart illustrating an example method for determining price elasticity.

DESCRIPTION OF EXAMPLE EMBODIMENTS

Figure 6:
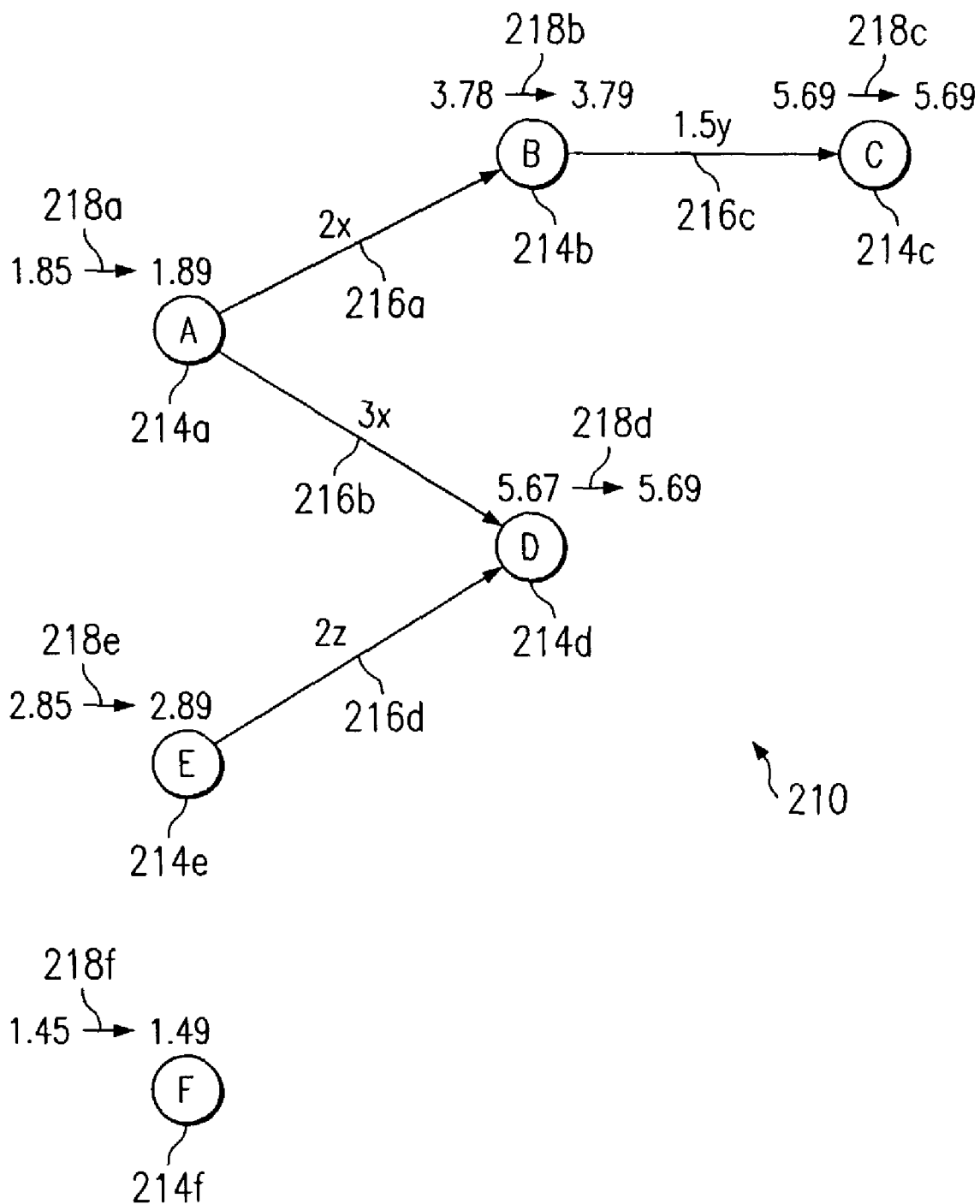
FIG. 6 illustrates an example graph representing the relationship between prices of items.

FIG. 1 illustrates an example system 10 that generates an optimized pricing plan for a category of items. A category may include one or more groups of items offered by a business such as parts, products, or services. Items may be related to each other by, for example, a price demand sensitivity or other constraint. A pricing plan lists prices for the items of a category at successive time intervals across a time period. A pricing plan may be subject to a hierarchy of objectives, for example, maximizing profits while maintaining consistent pricing and a given sales volume. A business may use system 10 to determine an optimized pricing plan for items offered by the business.

In one embodiment, client system 20 allows a user to communicate with a server system 24 to generate an optimized pricing plan. Client system 20 and server system 24 may each operate on one or more computers and may include appropriate input devices, output devices, mass storage media, processors, memory, or other components for receiving, processing, storing, and communicating information according to the operation of system 10. As used in this document, the term "computer" refers to any suitable device operable to accept input, process the input according to predefined rules, and produce output, for example, a personal computer, work station, network computer, wireless telephone, personal digital assistant, one or more microprocessors within these or other devices, or any other suitable processing device. "Each" as used in this document refers to each member of a set or each member of a subset of a set.

Client system 20 and server system 24 may be integrated or separated according to particular needs. For example, the present invention contemplates the functions of both client system 20 and server system 24 being provided using a single computer system, for example, a single personal computer. If client system 20 and server system 24 are separate, client system 20 may be coupled to server system 24 using one or more local area networks (LANs), metropolitan area networks (MANs), wide area networks (WANs), a global computer network such as the Internet, or any other appropriate wire line, wireless, or other links.

Server system 24 manages applications that generate an optimized pricing plan, such as an optimizer 28, workflows 32, and a demand analytics module 36. Optimizer 28 generates a mathematical programming model that represents a pricing plan problem, and optimizes the mathematical programming model in order to determine an optimized pricing plan. Optimizer 28 may include a pre-processing module 40, a mathematical programming module 42, and a post-processing module 44. Pre-processing module 40 performs pre-processing to set up the pricing plan problem. For example, pre-processing module 40 may identify and eliminate inconsistent constraints, divide a category into more manageable item groups, and determine goals for individual time intervals, item groups, or locations. Pre-processing module 40, however, may perform any function suitable for setting up the pricing plan problem.

Mathematical programming module 42 generates a mathematical programming model having objectives and constraints formulated by mathematical equations and inequalities. According to one example, the mathematical model may include a non-linear relation, and may be solved using non-linear programming (NLP) techniques such as, for example, a reduced-gradient technique or a projected augmented Lagrangian technique.

Mathematical programming module 42 may include a modeling language 46, a solver 48, and an application program interface (API) 50. Modeling language 46 may include, for example, A Mathematical Programming Language (AMPL) developed at Bell Laboratories, General Algebraic Modeling System (GANS) by GAMS DEVELOPMENT CORPORATION, Advanced Interactive Mathematical Modeling Software (AINNS) by PARAGON DECISION TECHNOLOGY B.V., or any other language suitable for modeling a pricing plan problem. Solver 48 optimizes the mathematical programming model to yield optimized results. Solver 48 may include, for example, a nonlinear programming solver such as MINOS by STANFORD BUSINESS SOFTWARE, INC., CONOPT by ARKI CONSULTING AND DEVELOPMENT A/S, or any other mathematical programming solver operable to optimize a pricing plan problem. Application program interface 50 may provide a link between optimizer 28 and server system 24.

Post-processing module 44 performs post-processing to conform optimized results generated by solver 48 to business constraints that might not have been taken into account during optimization. For example, post-processing module 44 may round prices in accordance with rounding rules, evaluate the cost of changing prices and adjust prices according to the cost evaluation, and prioritize price changes according to priority rules. Post-processing modules 44, however, may perform any function suitable for conforming the optimized result to business constraints.

Workflows 32 supply information for formulating the pricing plan problem. Workflows 32 may include, for example, demand planning workflows 54, replenishment planning workflows 56, and merchandise planning workflows 58. Demand planning workflows 54 may be used to forecast a demand by, for example, determining a demand change in response to a price change. Replenishment planning workflows 56 may be used to ensure that inventories have an adequate supply of items in order to satisfy an optimized pricing plan. Merchandise planning workflows 58 may describe pricing goals for the items. For example, a pricing goal may require low prices for dairy items and higher prices for cleaning items.

Demand analytics module 36 calculates price elasticity, which describes how a price change affects a demand. The price elasticity of a demand may be defined as the ratio of a percentage change in demand over a percentage decrease in price. According to this definition, price elasticity is non-negative due to the inverse relationship between demand and price. Cross price elasticity measures how a price change of one item affects a demand of another item. Cross price elasticity of a demand may be defined as a percentage change in demand of an item resulting from a percentage increase in price of another item. Cross price elasticity may be positive, negative, or zero. A positive cross price elasticity implies that the demand of an item increases if the price of another item decreases, whereas a negative cross price elasticity implies that the demand of an item decreases if the price of another item decreases. A zero cross price elasticity implies that the demand of an item is not affected by the price of another item. Demand models may be used to calculate price elasticity. Demand analytics module 36 evaluates and selects appropriate demand models and calculates price elasticity using the selected demand models. Database 60 may be local to or remote from server system 24, and may be coupled to server system 24 using one or more local area networks (LANs), metropolitan area networks (MANs), wide area networks (WANs), a global computer network such as the Internet, or any other appropriate wire line, wireless, or other links.

A database 60 stores data that may be used by server system 24. Database 60 may include, for example, constants 64, variables 66, objectives 68, constraints 70, demand data 71, and demand models 72. Constants 64 and variables 66 are used to generate a mathematical programming model representing a pricing plan problem. Constants 64 may include, for example, the following:

| | |
|---|---|
| G | Group of items to be optimized together, for example, a group of items that are directly or indirectly related by constraints; |
| I | Sub-group of image items used to track a competitor's prices; |
| $l_{ij}$ | Price link constraint between items i and j constraining their prices using an equality relation that may include an additive term; |
| $b_{ij}$ | Price band constraint between items i and j constraining the range of one item with respect to the other item using a relation that may include an additive term; |
| $e_{ij}$ | Cross-elasticity lift modeling sensitivity of demand of item j based on price of item i and base price of item i; |
| $q_i$ | Base price of item i, on which demand forecast is based; |
| $c_i$ | Cost of item i; |
| $\underline{p_i}, \overline{p_i}$ | Lower bound and upper bound for price of item i; |
| $o_i$ | Competitor's price of item i; |
| $f_i$ | Forecast for an optimization period based on current price of item i; and |
| $u_i$ | Available inventory. |

Variables 66 may include, for example, the following:

| | |
|---|---|
| $p_i$ | Price of item i; |
| $d_j = \prod_{i \in G} e_{ij}(p_i, q_i) \cdot f_i$ | Demand for item i in an optimization period, given price $p_i$; |
| $m_j = d_j \cdot (p_i - c_i)$ | Profit from selling item j; |
| $I_j = \sum_{i \in I} \frac{p_i}{o_i |I|}$ | Image-index over the index items used to track competitor's prices; |
| $M = \sum_{i \in G} m_i$ | Total profit from selling all items; |
| $R = \sum_{i \in G} (p_i \cdot d_i)$ | Total revenues from selling all items; and |
| $P = M/(R + \epsilon)$ | Total profit percentage for which a small fractional term $\epsilon$ is used to avoid division-by-zero on zero-revenues. |

Objective functions 68 represent objectives to be optimized to generate an optimized pricing plan. Objectives may be defined by, for example, acceptable performance measured by profits, revenues, unit sales, competitive image, or other suitable measure of performance. Other objectives, however, may be used.

Constraints 70 restrict the optimization of objective functions 68. Constraints 70 may, for example, restrict prices in response to a cost to produce an item, a manufacturer's suggested retail price, a competitor's price, or a maximum price change restriction. Constraints 70 may link related items such as different quantities of the same item or different brands of the same item. Such constraints 70 may include, for example, price-linked constraints or band constraints such as item-price inequalities. Constraints 70 may restrict prices with respect to a demand, for example, demand-price relations or cross-price elasticities. Constraints 70 governing price changes such as a minimum time between price changes, a maximum number of simultaneous price changes, or an implementation-cost constraint may be included. Constraints 70 for controlling inventory may be used to avoid stock-outs or to accommodate lead-times. Constraints 70 may be directional, such that the price of a first item may affect the price of a second item, but the price of the second item does not affect the price of the first item. Constraints 70 may be received from any suitable source, such as from a user of client system 20 or from demand analytics module 36.

The following is an example of an objective function 68 and constraints 70, where profit is maximized subject to constraints.

| max M | subject to |
|---|---|
| $\underline{p_i} \leq p_i \leq \overline{p_i}$ | price limits |
| $p_i = l_{ij} \cdot p_j$ | price link constraints |
| $p_i \leq b_{ij} \cdot p_j$ | price band constraints |

Any suitable objective function 68 or constraints 70, however, may be used.

Demand data 71 includes data that may be used to determine a price elasticity. Demand data 71 may include, for example, sales history, price history, competitor's prices, inventory availability, and other information that may be used to determine the relationship between price and demand. Demand models 72 may be applied to demand data 71 to determine price elasticity. Demand models 72 may include, for example, constant elasticity static models and models with coefficients varying according to functions such as polynomial or log functions. Demand models 72 may include distributed lag models according to which a previous price affects a current demand. Demand models 72 may include, for example, the following demand model.

$$\mathrm{Log}(d) = c + e\ \mathrm{log}(P)$$

$$\mathrm{Log}(d) = c + \beta P$$

$$\mathrm{Log}(d) = c + \sum_{i=0}^{n} e_i \mathrm{log}(P_{-i})$$

where:
d=demand
c=constant/intercept
P=price
e=elasticity
$P_{-i}$=ith lagged price if $$e_i = \alpha_0 + \sum_{j=0}^{m} \alpha_j i^j$$

FIG. 2 is a flowchart illustrating an example method for generating an optimized pricing plan. The method begins at step 100, where pre-processing module 40 performs pre-processing in order to set up a pricing plan problem. Pre-processing is described in more detail with reference to FIG. 3. Mathematical programming module 42 generates a mathematical programming model of the pricing plan problem at step 102. The mathematical programming model may be expressed in modeling language 46.

Solver 48 optimizes the mathematical programming model at step 104 to generate optimized results. Optimization of the mathematical programming model is described in more detail with reference to FIG. 4. Post-processing module 44 performs post-processing at step 106. Post-processing may be performed to conform the optimized results to predetermined business constraints. Post-processing is described in more detail with reference to FIG. 5. An optimized pricing plan is reported at step 108, and the method ends.

The method may be performed multiple times in order to generate multiple locally optimal pricing plans. The pricing plans may be evaluated to determine a globally optimal pricing plan.

FIG. 3 is a flowchart illustrating an example method for performing pre-processing to set up a pricing plan problem for a category of items. The method begins at step 120, where pre-processing module 40 fixes the prices of a category of items according to one or more constraints. The prices of certain items may be fixed to satisfy a constraint. For example, a price may be fixed for a time interval if changing the price violates a maximum number of allowed price changes during the time interval. Items are de-linked to avoid inconsistencies at step 122. For example, if the price of an item A is linked to be equal to the price of an item B, but the price of item A and the price of item B are fixed at different prices, then the prices of items A and B are de-linked.

The category of items is split into item groups at step 124. A category may include many unrelated items for which it may be inefficient to optimize together. Accordingly, a category may be split into item groups that are optimized separately. An item group may include items that are related by one or more constraints. Appropriate item groups may be merged at step 126. Some of the item groups formed at step 124 may be too small to provide optimization with sufficient flexibility. Smaller item groups may be merged to form a larger item group that may be efficiently optimized with sufficient flexibility.

Goals are balanced across the time intervals of the optimization period at step 128. For example, a company may select to achieve a higher percentage of sales during peak time intervals and a lower percentage of sales during non-peak time intervals. Goals are balanced across item groups at step 130. For example, a company may select to increase sales for more popular item groups but not for other item groups. Goals are balanced across geography at step 132. For example, a company may select to increase sales at stores in certain locations but not in other locations. Results are reported at step 134, and the method ends.

FIG. 4 is a flowchart illustrating an example method for optimizing a mathematical programming model subject to a hierarchy of objectives and constraints. The method begins at step 150, where a hierarchy comprising levels of objectives and constraints is created. A hierarchy may include, for example, a primary objective of maximizing revenue, a secondary objective of maximizing sales, and a tertiary objective of maintaining consistent prices.

Optimizer 28 selects a level comprising an objective and one or more associated constraints at step 152. An objective function having slack variables is formulated at step 154 to represent the selected objective and constraints. For example, an objective of meeting a revenue goal range may be formulated as follows. Goal LB and Goal UB represent lower and upper bounds, respectively, of the revenue goal range. RevenueMin and RevenueMax represent constraints restricting minimum and maximum revenue, respectively. MinSlack and MaxSlack represent slack variables for RevenueMin and RevenueMax, respectively. Revenue Slack represents slack variables to be optimized.

MinSlack>=0;
MaxSlack>=0;
subject to RevenueMin:
   Revenue+MinSlack>=GoalLB;
subject to RevenueMax:
   Revenue<=GoalUB+MaxSlack;
minimize RevenueSlack:
   MinSlack+MaxSlack;

The slack variables are optimized at step 156. For example, the slack variables MinSlack and MaxSlack as expressed by RevenueSlack are minimized. Optimized boundaries are determined in accordance with the optimized slack variables at step 158. The optimized boundaries may be fixed at the values resulting from the optimization of the slack variables in order to ensure that the objectives are not violated beyond this level during subsequent iterations of the optimization.

If a last level of the hierarchy has not been reached at step 160, optimizer 28 returns to step 152 to select the next level of an objective and one or more constraints. If a last level has been reached at step 160, optimizer 28 proceeds to step 162 to select the last level. The objective of the last level is optimized subject to the associated constraints at step 164. Results are reported at step 166, and the method ends.

According to one embodiment, using a hierarchy of objectives may offer an advantage over combining objectives according to a weighting scheme. An advantage of one embodiment may be that a weighting scheme requires setting the weights to spread the numerical range of the objectives in order to optimize the objectives. Defining such a weighting scheme may pose difficulties, however, since the range of each sub-objective may not be known before the optimization is complete. Furthermore, introducing widely varying weights to spread apart the different objectives may lead to numerical instabilities and problematic numerical scaling.

FIG. 5 is a flowchart illustrating an example method for performing post-processing of the results from optimizing a mathematical programming model. Post-processing is performed in order to conform the optimized results to business constraints. The method begins at step 180, where post-processing module 44 evaluates the performance of the optimized results.

A rounding and propagation procedure is applied at step 182. A rounding and propagation procedure may be performed by, for example, using a graph representing the relationship between prices of items. An example of such graph is described with reference to FIG. 6.

FIG. 6 illustrates an example graph 210 representing the relationship between prices of items. Circles 214 represent the prices for items A through F. Propagation arrows 216 represent rules for propagating the price of one item to determine the price of another item. For example, the price of item A is propagated to determine the price of item B by multiplying the price of item A by two. Rounding arrows 218 represent rounding rules. In the illustrated example, a rounding rule states that a price must be rounded up to the next price that ends with a nine, for example, $1.85 is rounded to $1.89.

According to an example rounding and propagation procedure, the price of item A is rounded. After the price of item A is rounded, the price is propagated to determine the price of item B. The price of item B is rounded, and then propagated to determine the price of item C, and so on. Once a price is determined, it is fixed to ensure consistent pricing. For example, once the price of item D is determined to be $5.69, it is not changed in accordance with a propagation from item E. Prices that are not linked with other prices are rounded independently of the rounding and propagation of the prices. For example, the price of item F is rounded independently of the rounding and propagation of other prices.

Returning to FIG. 5, the performance of the rounded and propagated prices is reevaluated at step 184. The reevaluation may be used to determine a change such as a decrease in performance resulting from applying the rounding and propagation procedure. The cost of changing the prices is evaluated at step 186. The cost may measure, for example, an operational cost of implementing price changes. Prices are adjusted in accordance with the cost evaluation at step 188. For example, minimum price changes may be set back to an original price in order to avoid an operational cost resulting from implementing the price changes. The improvement of performance resulting from a price change may be calculated in order to determine whether the price change justifies the cost incurred for implementing the price change.

Post-processing module 44 determines whether the number of price changes exceed a predetermined maximum number of price changes at step 190. If the number of price changes exceeds a maximum number of price changes, post-processing module 44 may proceed to steps 192, 194, or 196 in order to determine which prices to change. Steps 192, 194, and 196 may be used to determine which prices are to be changed, or may be used to prioritize prices such that higher priority prices are changed during one time interval, and lower priority prices are changed during a next time interval.

At step 192, the prices of items with the larger price changes are changed. Larger price changes may have a greater impact and are less likely to change again in comparison with smaller price changes. At step 194, prices of image items used to track competitors are changed because image items may be regarded as more important. At step 196, the prices of items with the more stable prices are changed. Changing the more stable prices may reduce the frequency of price changes, which may provide for more consistent pricing. If the number of price changes does not exceed a maximum number of price changes at step 190, the method proceeds directly to step 198.

Performance under the revised pricing plan is re-evaluated at step 198. The performance may be re-evaluated in order to allow for comparison with the optimization results. The results are reported at step 200, and the method ends.

FIG. 7 is a flowchart illustrating an example method for determining price elasticity. According to the method, demand data 71 is processed, an appropriate demand model 72 is selected, and a price elasticity is calculated according to the selected demand model 72. The method may be used to provide price elasticity values for specific time periods, which may allow for more accurate calculations of price elasticity as more demand data 71 is gathered.

The method begins at step 300, where demand analytics module 36 accesses demand data 71. Demand data 71 is filtered at step 302. Demand data 71 may be filtered for outliers that may distort the calculation of a price elasticity. Influential observation analysis may be used to identify outliers. Missing observations may be determined using expectation maximization and included in demand data 71. Demand data 71 may include constrained sales data that does not provide an accurate representation of demand. For example, stockouts, not demand, may decrease sales, resulting in sales data that does not accurately reflect demand. Sales data included in demand data 71 is unconstrained at step 304. Any suitable approach such as a censored regression approach using a Tobit model may be used to unconstrain constrained data.

Demand data 71 may be insufficient to compute an accurate price elasticity. If there is insufficient demand data 71 at step 306, demand analytics module 36 proceeds to step 308 to cluster demand data 71. Demand data 71 for items with similar attributes are clustered to yield sufficient demand data 71 with which to calculate price elasticity. Demand data 71 may be clustered by, for example, pooling or aggregating data. According to pooling, data associated with similar items are collected together. For times series data, pooling data may provide a distribution of errors for a given set of values of regressors at a given time. According to aggregation, values such as revenue and sales associated with similar items are summed or averaged together. After clustering demand data 71, demand analytics module 36 proceeds to step 310. If there is sufficient demand data 71 at step 306, demand analytics module 36 proceeds directly to step 310.

Demand models 72 are accessed at step 310. Demand models 72 may include, for example, constant elasticity static models or models with coefficients varying according to functions. A demand model 72 of the accessed demand models 72 is selected at step 312. Selected demand model 72 is evaluated at step 314. A number of processes may be used to evaluate demand model 72. For example, a regression specification error test and the Schwarz information criteria may be used. The regression specification error test may be used to determine whether a demand model 72 is acceptable, and the Schwarz information criterion may be used to select an optimal demand model 72.

The regression specification error test is used to determine whether a demand model 72 is mis-specified. For example, the regression specification error test may be applied to the following demand model described by Equation (1):

$$Y_i = \lambda_1 + \lambda_2 X_i + u_i \quad (1)$$

where
Y=total cost
X=output
u=residual
subscript i=ith observation

The residuals $\hat{u}_i$ obtained from this regression are plotted against an estimated total cost $\hat{Y}_i$ of the demand model. A pattern of residuals $\hat{u}_i$ with means that change as estimated total cost $\hat{Y}_i$ changes implies that the regression should improve if estimated total cost $\hat{Y}_i$ is itself included as another explanatory variable, which means that there is a pattern still left in the residuals which would not be there if the demand model included the proper variables. That is, the demand model is mis-specified.

According to one example, the specific steps of applying the regression specification error test to the demand model expressed by Equation (1) are as follows:
1. Obtain the estimated total cost $\hat{Y}_i$ using Equation (1).
2. Introduce $\hat{Y}_i$ in some form as an additional regressor or additional regressors to Equation (1). For example, depending upon the shape of the observed pattern of residuals, $\hat{Y}_i^2$ and $\hat{Y}_i^3$ may be introduced to Equation (1) to yield Equation (2):

$$Y_i = \lambda_1 + \lambda_2 X_i + \lambda_3 \hat{Y}_i^2 + \lambda_4 \hat{Y}_i^3 + u_i \quad (2)$$

Run Equation (1).
3. Let the ratio $R^2$ of the explained variance to the total variance in the data for the dependent variable obtained from Equation (2) be $$R^2_{new}$$

and $R^2$ obtained from Equation (1) be $$R^2_{old}.$$

The F test expressed by the following equation may be used to determine whether the increase in $R^2$ is statistically significant.

$$F = \frac{(R^2_{new} - R^2_{old})/\text{number of new regressors}}{\frac{(1 - R^2_{new})}{(n - \text{number of parameters in the new model})}}$$

4. If the computed F value is statistically significant, then the demand model expressed by Equation (1) may be labeled as mis-specified.

The Schwarz information criterion calculates lag length to evaluate a demand model. Lag length measures the time between a price change and a change in demand resulting from the price change. The Schwarz information criterion is given by the following equation:

$$SC = \ln(\overline{\sigma^2}) + m\ln(n)$$

where
$\overline{\sigma^2}$=maximum likelihood estimate of $\sigma^2$
$\sigma^2$=RSS/n
RSS=residual sum of squares
n=number of observations
m=lag length Demand model 72 is run with several values for m, and demand model 72 for which SC is minimized is selected. Other processes may be used to evaluate demand model 72, for example, the Akaike information criterion.

The selected demand model 72 is validated with respect to demand data 71 at step 316. Part of demand data 71 may be used to calibrate the demand model, and part of demand data 71 may be used to test the fit of demand data 71 to demand model 72. Measures such as a mean absolute deviation or a mean absolute percentage error may be used to check the fit of demand data 71. Demand model 72 may be validated with respect to multi-colinearity, heteroskedasticity, and serial correlation. For example, cross validation may be used to check if similar items that are expected to behave similarly do so according to demand model 72.

If there is a next demand model 72 of the accessed demand models 72 at step 318, demand analytics module 36 returns to step 312 to select the next demand model 72. If there is no next demand model 72 at step 318, demand analytics module 36 proceeds to step 320. At step 320, a demand model 72 is selected in response to the evaluations. Price elasticity is calculated according to the selected demand model 72 at step 322. The price elasticity may be calculated using a Bayesian approach. According to the Bayesian approach, the following equation may be used to calculate the probability of a specific price elasticity value A given the occurrence of an event B, expressed as P(A|B).

$$P(A\mid B) = \frac{P(B\mid A)P(A)}{P(A)P(B\mid A) + P(A')P(B\mid A')}$$

Probability P(A|B) may be used to determine the most likely price elasticity value A given that demand data 71 shows that event B has occurred. Probabilities P(B|A) and P(B|A') may be calculated according to the selected demand model. Prior probability P(A) may be calculated from demand data 71 or from an initial estimate. The selection of an elasticity value A may be used to determine probability P(A) for subsequent iterations.

The calculated price elasticity is reported at step 324. Demand analytics module 36 determines whether there is a next time period at step 326. If there is a next time period, demand analytics module 36 proceeds to step 328 to update demand data 71 and then returns to step 300 to access the updated demand data 71. If there is no next time period at step 326, the method ends.

Certain embodiments of the invention may provide one or more technical advantages. A technical advantage of one embodiment may be that a pricing plan problem may be optimized according to a hierarchy of objectives, for example, maximizing profits while maintaining consistent pricing and a given sales volume. Optimizing a pricing plan problem according to a hierarchy of objectives may provide a pricing plan that better fits a company's objectives. Another technical advantage of one embodiment may be that pre-processing may be performed to set up a pricing plan problem. Pre-processing may include, for example, identifying and eliminating inconsistent constraints, dividing a category of items into more manageable item groups, and determining goals for individual time intervals, item groups, or locations. Another technical advantage of one embodiment may be that post-processing may be performed to conform optimized results to business constraints that might not have been taken into account during optimization. Post-processing may include, for example, rounding prices in accordance with rounding rules, evaluating the cost of changing prices and adjusting prices according to the cost evaluation, and prioritizing price changes according to priority rules.

Although an embodiment of the invention and its advantages are described in detail, a person skilled in the art could make various alterations, additions, and omissions without departing from the spirit and scope of the present invention as defined by the appended claims.

What is claimed is:

1. A computer-implemented method for calculating price elasticity, the method performed using one or more computer systems each comprising one or more processing units and one or more memory units, the method comprising:

accessing a plurality of demand models;

accessing demand data describing a plurality of items;

evaluating the demand models in accordance with the demand data;

selecting a demand model of the evaluated demand models in response to the evaluation; and calculating a price elasticity according to the selected demand model by:

accessing a set of price elasticity values;

for each price elasticity value, determining a probability of the price elasticity value given an event, the demand data describing the event; and determining the price elasticity value in accordance with the determined probabilities of the price elasticity value given the event; and reporting the calculated price elasticity.

2. The method of claim 1, wherein evaluating the demand models in accordance with the demand data comprises evaluating the demand models according to a Schwarz information criterion.

3. The method of claim 1, wherein evaluating the demand models in accordance with the demand data comprises evaluating the demand models according to a regression specification error test.

4. The method of claim 1, further comprising:

generating a constraint in accordance with the price elasticity for a hierarchy of constraints, wherein the hierarchy of constraints comprises a sequence of levels, each level comprising an objective function and a set of constraints associated with the objective function;

determining a mathematical programming model representing a pricing plan problem for an item group comprising a plurality of items;

for each level of the sequence of levels:

selecting a level comprising an objective function and a set of constraints associated with the objective function;

determining an optimized boundary for the objective function;

generating a constraint from the optimized boundary; and adding the generated constraint from the optimized boundary to the set of constraints of a next level;

optimizing an objective function of a last level of the sequence subject to the set of constraints associated with the objective function to yield an optimized result, the set of constraints comprising a constraint generated from the optimized boundary of a previous level; and generating an optimized pricing plan in accordance with the optimized result, the optimized pricing plan associating a price with each item of the item group.

5. A system for calculating price elasticity, comprising:

one or more processing units and one or more memory units;

a database operable to store a plurality of demand models and demand data describing a plurality of items; and a module coupled to the database and operable to:

evaluate the demand models in accordance with the demand data;

select a demand model of the evaluated demand models in response to the evaluation; and calculating a price elasticity according to the selected demand model by:
accessing a set of price elasticity values;
for each price elasticity value, determining a probability of the price elasticity value given an event, the demand data describing the event; and
determining the price elasticity value in accordance with the determined probabilities of the price elasticity value given the event; and
report the calculated price elasticity.

6. The system of claim 5, wherein the module is operable to evaluate the demand models in accordance with the demand data by evaluating the demand models according to a Schwarz information criterion.

7. The system of claim 5, wherein the module is operable to evaluate the demand models in accordance with the demand data by evaluating the demand models according to a regression specification error test.

8. The system of claim 5, further comprising an optimizer operable to:
generate a constraint in accordance with the price elasticity for a hierarchy of constraints, wherein the hierarchy of constraints comprises a sequence of levels, each level comprising an objective function and a set of constraints associated with the objective function;
determine a mathematical programming model representing a pricing plan problem for an item group comprising a plurality of items;
for each level of the sequence of levels:
selecting a level comprising an objective function and a set of constraints associated with the objective function;
determining an optimized boundary for the objective function;
generating a constraint from the optimized boundary; and
adding the generated constraint from the optimized boundary to the set of constraints of a next level;
optimize an objective function of a last level of the sequence subject to the set of constraints associated with the objective function to yield an optimized result, the set of constraints comprising a constraint generated from the optimized boundary of a previous level; and
generate an optimized pricing plan in accordance with the optimized result, the optimized pricing plan associating a price with each item of the item group.

9. Software for calculating price elasticity, the software encoded in a computer-readable media and when executed operable to:
access a plurality of demand models;
access demand data describing a plurality of items;
evaluate the demand models in accordance with the demand data;
select a demand model of the evaluated demand models in response to the evaluation;
calculate a price elasticity according to the selected demand model by:
accessing a set of price elasticity values;
for each price elasticity value, determining a probability of the price elasticity value given an event, the demand data describing the event; and
determining the price elasticity value in accordance with the determined probabilities of the price elasticity value given the event; and
report the calculated price elasticity.

10. The software of claim 9, wherein the software is operable to evaluate the demand models in accordance with the demand data by evaluating the demand models according to a Schwarz information criterion.

11. The software of claim 9, wherein the software is operable to evaluate 15 the demand models in accordance with the demand data by evaluating the demand models according to a regression specification error test.

12. The software of claim 9, further operable to:
generate a constraint in accordance with the price elasticity for a hierarchy of constraints, wherein the hierarchy of constraints comprises a sequence of levels, each level comprising an objective function and a set of constraints associated with the objective function;
determine a mathematical programming model representing a pricing plan problem for an item group comprising a plurality of items;
for each level of the sequence of levels:
selecting a level comprising an objective function and a set of constraints associated with the objective function;
determining an optimized boundary for the objective function;
generating a constraint from the optimized boundary; and
adding the generated constraint from the optimized boundary to the set of constraints of a next level;
optimize an objective function of a last level of the sequence subject to the set of constraints associated with the objective function to yield an optimized result, the set of constraints comprising a constraint generated from the optimized boundary of a previous level; and
generate an optimized pricing plan in accordance with the optimized result, the optimized pricing plan associating a price with each item of the item group.

13. A method for calculating price elasticity, comprising:
accessing a plurality of demand models;
accessing demand data describing a plurality of items;
evaluating the demand models in accordance with the demand data according to at least one of a Schwarz information criterion and a regression specification error test;
selecting a demand model of the evaluated demand models in response to the evaluation;
calculating a price elasticity according to the selected demand model by:
accessing a set of price elasticity values;
for each price elasticity value, determining a probability of the price elasticity value given an event, the demand data describing the event; and
determining the price elasticity value in accordance with the determined probabilities of the price elasticity value given the event;
generating a constraint in accordance with the price elasticity for a hierarchy of constraints, wherein the hierarchy of constraints comprises a sequence of levels, each level comprising an objective function and a set of constraints associated with the objective function;
determining a mathematical programming model representing a pricing plan problem for an item group comprising a plurality of items;
for each level of the sequence of levels:
selecting a level comprising an objective function and a set of constraints associated with the objective function;

determining an optimized boundary for the objective function; and generating a constraint from the optimized boundary; and adding the generated constraint generated from the optimized boundary to the set of constraints of a next level;

optimizing an objective function of a last level of the sequence subject to the set of constraints associated with the objective function to yield an optimized result, the set of constraints comprising a constraint generated from the optimized boundary of a previous level;

generating an optimized pricing plan in accordance with the optimized result, the optimized pricing plan associating a price with each item of the item group; and reporting the optimized pricing plan.

* * * * *